United States Patent
Bönning et al.

[11] Patent Number: 5,863,103
[45] Date of Patent: *Jan. 26, 1999

[54] LIGHT-METAL STRIP WHEEL

[75] Inventors: Meinhard Bönning; Ralf Duning, both of Solingen; Uwe Gohrbandt, Haan; Gerhard Söllner, St. Augustin, all of Germany

[73] Assignee: Mannesmann Aktiengesellschaft, Düsseldorf, German

[ * ] Notice: This patent issued on a continued prosecution application filed under 37 CFR 1.53(d), and is subject to the twenty year patent term provisions of 35 U.S.C. 154(a)(2). y

[21] Appl. No.: 709,044

[22] Filed: Sep. 6, 1996

[30] Foreign Application Priority Data

Sep. 6, 1995 [DE] Germany .......................... 195 34 522 3

[51] Int. Cl.$^6$ ....................................................... B60B 3/08
[52] U.S. Cl. ......................................... 301/64.3; 301/64.2
[58] Field of Search .................................. 301/63.1, 64.1, 301/64.2, 64.3, 64.4, 64.5; 29/894.325

[56] References Cited

U.S. PATENT DOCUMENTS

| | | | |
|---|---|---|---|
| 1,037,812 | 9/1912 | Voller | 301/64.2 |
| 1,227,841 | 5/1917 | Schwab | 301/64.2 |
| 1,392,381 | 10/1921 | Williams | 301/64.2 |
| 1,606,175 | 11/1926 | Olinger | 301/64.5 X |
| 1,613,127 | 1/1927 | Reyneri | 301/64.2 |
| 1,828,340 | 10/1931 | Reed | 301/64.2 X |
| 1,932,289 | 10/1933 | Jarvis et al. | 301/64.3 |
| 2,000,573 | 5/1935 | Spatta | 301/64.2 X |
| 4,223,952 | 9/1980 | Weld | 301/64.3 X |

FOREIGN PATENT DOCUMENTS

| | | | |
|---|---|---|---|
| 647284 | 7/1937 | Germany | 301/64.3 |
| 2423181 | 11/1975 | Germany | 301/64.3 |
| 82881 | 11/1919 | Switzerland | 301/64.2 |

*Primary Examiner*—Russell D. Stormer
*Attorney, Agent, or Firm*—Cohen, Pontani, Lieberman & Pavane

[57] ABSTRACT

A light-metal strip wheel, in particular for motor vehicles, which includes a wheel disk and a rim. The wheel disk comprises two wheel-disk parts each having a ventilation hole. The ventilation holes have necks that when pressed into one another, secure together the two wheel-disk parts with the two parts separated from one another in the region surrounding the ventilation holes, while coming to rest on one another in a hub region. The space between the two wheel-disk parts in the region surrounding the ventilation holes increases the stiffness of the strip wheel so that the wheel is suitable for accommodating large loads.

13 Claims, 2 Drawing Sheets

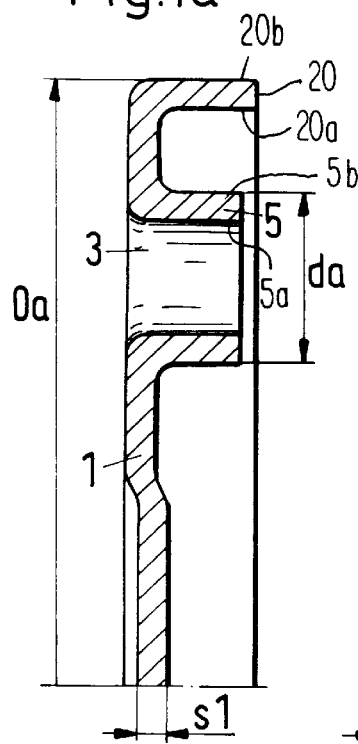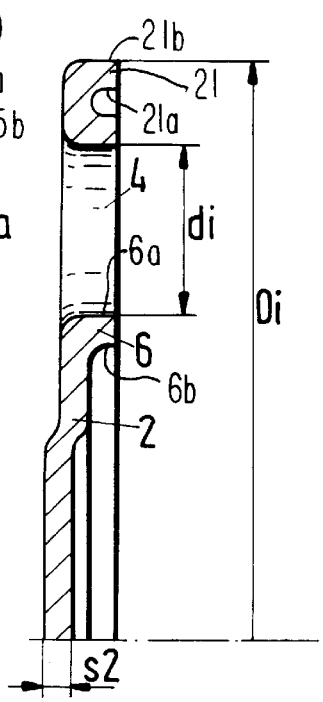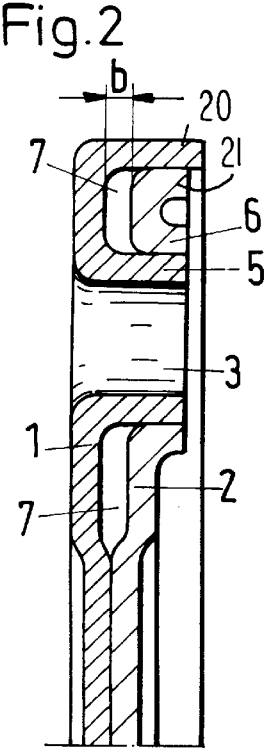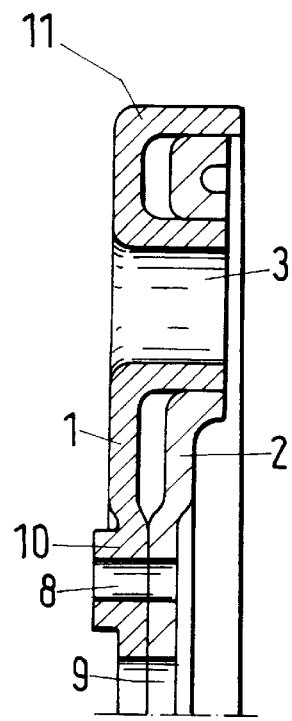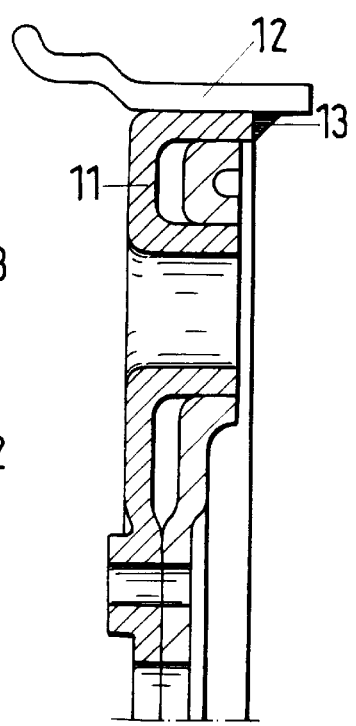

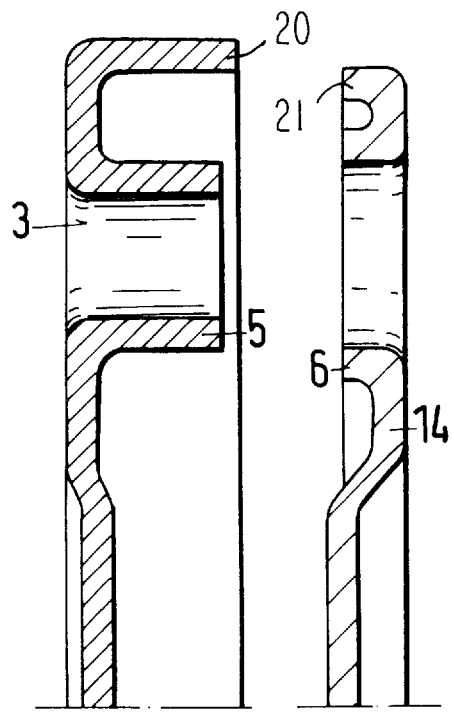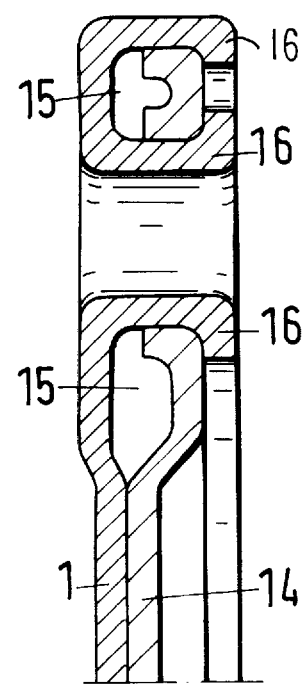

LIGHT-METAL STRIP WHEEL

BACKGROUND OF THE INVENTION

1. Field of the Invention

The present invention relates to a light-metal strip wheel, in particular for motor vehicles. An application of the light-metal strip wheel in accordance with the invention is for a vehicle in which disposed around the light-metal strip wheel is a tire.

2. Description of the Related Art

A conventional light-metal strip wheel is described in German patent publication DE-OS 33 28 135. In order to avoid welded connections, this strip wheel is composed of a plurality of sheet blanks connected in a positive locking fashion to form a rim with rim flanges and a wheel disk. Edge regions of the wheel disk are held in the rim flanges by means of clinching. This design has the disadvantage of being insufficiently stiff and therefore is suitable only for medium loads. Furthermore, the clinching process necessitates a large number of manufacturing steps.

A similar vehicle wheel is described in German patent publication DE-AS 24 23 181. This vehicle wheel has a double-walled wheel disk and a flat-base rim connected thereto. The two wheel-disk walls are connected to one another. The inner rim part is formed by one wall and the outer rim part is formed by the other wall. The double-walled wheel disk has ventilation holes, and the two wheel parts are connected to one another by means of hole riveting at the ventilation holes.

It is desirable to develop a light-metal strip wheel having sufficient stiffness so that it can accommodate large loads and yet simple to manufacture.

SUMMARY OF THE INVENTION

An object of the present invention is to provide a substantially light-metal strip wheel which is lightweight, stiff and simple to manufacture.

In accordance with the invention a light-metal strip wheel, in particular for motor vehicles, includes a wheel disk and rim. The wheel disk comprises two wheel-disk parts each having a ventilation hole. The ventilation holes have necks that, when pressed into one another, secure together the two wheel-disk parts with the two wheel-disk parts separated from one another in the region surrounding the ventilation holes, while coming to rest upon one another in the hub region. The spacing between the two wheel-disk parts in the region surrounding the ventilation holes increases the stiffness so that the strip wheel is suitable for accommodating large loads.

The light-metal wheel design is advantageous in that it is lighter than conventional light-metal wheels because the two wheel-disk parts do not require the use of sheet-metal having a large or significant thickness. In addition, even though the wheel is lighter in weight, it possesses sufficiently high stiffness for sustaining or accommodating large loads.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIGS. 1a & 1b depicts respective cross-sectional views of a wheel-disk outer part and a wheel-disk inner part, in the unassembled state, in accordance with the invention;

FIG. 2 depicts a cross-sectional view of the two wheel-disk parts of FIGS. 1a & 1b, in the assembled state, in accordance with the invention;

FIG. 3 depicts a cross-sectional view of the assembled two wheel-disk parts of FIG. 2, including the attachment hole and axis guide hole, in accordance with the invention;

FIG. 4 depicts a cross-sectional view of an assembled wheel including a wheel disk and a rim, in accordance with the invention;

FIGS. 5a & 5b show cross-sectional views of an alternate embodiment of a wheel-disk outer part and a wheel-disk inner part, in the unassembled state, in accordance with the invention; and FIG. 6 is a cross-sectional view of the two wheel-disk parts of FIGS. 5a & b, in an assembled state, in accordance with the invention.

DETAILED DESCRIPTION OF THE PRESENTLY PREFERRED EMBODIMENTS

A wheel disk constructed in accordance with the present invention is formed of two wheel-disk parts 1,2, as respectively shown in FIGS. 1a & 1b. Wheel-disk part 1 represents a wheel-disk outer part and the other wheel-disk part 2 represents a wheel-disk inner part. Each wheel-disk part 1,2 is formed or fabricated of a substantially light-metal strip material, preferably aluminum. Each wheel-disk part 1,2 includes a respective neck 5,6 extending therethrough toward the inside of the wheel and thereby defining respective ventilation holes 3,4. The neck 5 has an inner surface 5a facing the ventilation hole 3 and an outer surface 5b. The neck 6 has an inner surface 6a facing the ventilation hole 4 and an outer surface 6b. In order to ensure that the two wheel-disk parts 1,2 will fit together to form a wheel disk, a maximum outer diameter "da" of neck 5 of wheel-disk part 1 is selected so that it is equal to or smaller than an inner diameter "di" of neck 6 of wheel-disk part 2. The wheel disk is assembled by inserting the neck 5 into the ventilation hole 4 so that a press fit engagement is provided and forms in a region between the outer surface 5b of neck 5 and the inner surface 6a of 6.

Each wheel-disk part 1, 2 includes another respective neck 20, 21 which also extends toward the inside of the wheel along the outermost circumference of each wheel-disk part 1, 2. Each neck 20, 21 has an inner surface 20a, 21a and an outer surface 20b, 21b, respectively. When the wheel-disk parts 1, 2 are assembled, the outer surface 21b contacts the inner surface 20a of neck 20. Inner surfaces 5a, 6a, 20a, and 21a and outer surfaces 5b, 6b, 20b, and 21b are substantially axial in direction.

FIG. 2 shows the two wheel-disk parts 1,2 in the assembled state. Prior to assembly, adhesive may be applied to one or both parts in the region of the press fit to ensure that the two wheel-disk parts 1,2 remain assembled. Once assembled, the two wheel-disk parts 1,2 are separated by a space 7 defined in a region surrounding the ventilation hole 3 and are in contact with one another in the hub region. The presence of the space 7 of the wheel design in accordance with the invention is advantageous in that it significantly contributes to the stiffness of the wheel, so that the wheel is capable of sustaining or accommodating larger loads than would otherwise be possible.

FIG. 3 shows the assembled wheel disk 11, comprising the engaged wheel-disk outer part 1 and wheel-disk inner part 2, after attachment hole 8 and axis guide hole 9 have been created in the hub region, as for example by stamping. When so stamping out the attachment hole 8, a stamping 10 is created extending outwardly therefrom. Stamping 10 provides the additional benefit of absorbing high surface pressures in the region of the attachment hole 8.

As illustrated in FIG. 4, the assembled wheel disk 11 is materially connected, as for example welded via a welded seam 13, to a rim 12. In an alternative modification or embodiment, adhesive may be applied between the wheel disk 11 and the rim 12 and hardened, as for example during stove enamel processing. Instead of or in addition to using an adhesive, the wheel disk 11 may be soldered to the rim 12. In accordance with this embodiment the two wheel-disk parts 1,2 and rim 12 are formed of partially solder-plated starting materials. Preferably, the rim 12 and the wheel-disk inner part 2 are formed of an AlMgSi strip plated on one side, and the wheel-disk outer part 1 of an unplated AlMgSi strip, or the wheel-disk outer part 1 may be formed of an AlMgSi strip plated on both sides and the rim 12 and wheel-disk inner part 2 of an unplated AlMgSi strip. When using partially plated AlMgSi strips for the rim and wheel-disk parts, the preferred plating material comprises X AlSi 10. However, other types of strips and plating material may also be used.

An alternate arrangement of the wheel-disk inner part is illustrated in FIGS. 5*a*, 5*b*. In contrast to FIG. 1*b* in which the necks 5 and 6 are arranged so that they face in the same direction (i.e. towards the inside of the wheel), in FIG. 5*b* the necks 5, 6 are positioned confrontingly opposite to one another. Thus, with the arrangement shown in FIG. 5*b* the hub region of the wheel-disk inner part 14 extends closer to the outside of the wheel than the hub region of the wheel-disk inner part 2 in the configuration shown in FIG. 1*b*. As in the embodiments described earlier herein, the two wheel-disk parts 1, 14 define therebetween a space 15 after assembly, as shown in FIG. 6. This modified arrangement provides an additional advantage over the configuration shown in FIG. 1*b*. Instead of, or in addition to, using an adhesive applied to the region between the necks 5,6, the two wheel-disk parts 1,2 may be connected to one another in a positive-locking manner such as by clinching, crimping or otherwise deforming the end of the neck 5 and 20 to form an end regions 16. All other aspects of the structure and invention previously described with respect to the embodiment shown in FIGS. 1*a*, 1*b* are also applicable to this modified embodiment.

Manufacture of a light-metal strip wheel, in accordance with the invention, begins by drawing a plurality of sheet blanks through a multiple die press multiple times to create the wheel-disk outer part 1 and the wheel disk inner part 2, with each wheel-disk part 1,2 having a respective neck 5,6 which defines a ventilation hole 3,4. The wheel-disk outer part 1 and the wheel-disk inner part 2 are then assembled by pressing the two disk parts together in a region surrounding each of the necks 5,6. In an alternate embodiment, prior to pressing the two wheel-disk parts together, adhesive may be applied to the necks 5,6 in the region of contact therebetween. Thereafter, the two wheel-disk parts 1,2 are redrawn to form a press fit in the region of the necks 5,6 with the two wheel-disk parts 1,2 separated by a space 7 in the region surrounding the necks 5,6 and in contact with one another in the hub region.

Wheel disk 11, comprising the assembled two wheel-disk parts 1,2, is then stamped in the hub region to thereby create the attachment hole 8 with the stamping 10 extending outwardly therefrom, and the axis guide hole 9. Next, the wheel disk 11 is pressed into and materially connected to the rim 12 to form the wheel. Rim 12 may be welded via a welding seam 13, as shown in FIG. 4, to the assembled wheel disk 11. Alternatively, the two wheel-disk parts 1,2 and rim 12 may be formed of partially solder-plated starting materials, as discussed above, and the wheel parts and rim soldered together in a vacuum oven and then cooled. Furthermore, in accordance with the wheel-disk arrangement illustrated in FIG. 6, the processing may include the additional step of clinching the end of the neck 5 and 20 of the wheel-disk outer part 1 to form end region 16.

Finish processing of the wheel includes stove enamel processing of the outer surface of the wheel and working the visible surface of the wheel such as by shot peening. The soldering and stove enamel processing of the wheel may be carried out in the framework of a total heat treatment in order to further increase the strength of the material. Any other known or appropriate finish processing steps are likewise within the intended scope of the invention.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A substantially light-metal strip wheel, comprising:
   a wheel disk including an axially-defined guide hole, a hub region defined about said guide hole, and an attachment hole defined in and through said wheel disk in said hub region, said wheel disk comprising a first wheel-disk part and a second wheel-disk part each having a first substantially axially extending neck boundingly defining a ventilation opening in each said first and second wheel-disk parts and a second substantially axially extending neck positioned at an outermost circumference of each said first and second wheel disk parts, said first and second wheel disk parts being configured to be pressed together so that when said first and second wheel-disk parts are pressed together in neck-to-neck contact to form said wheel disk, said first and second wheel-disk parts are predeterminately spaced apart in a direction substantially perpendicular to a plane of said wheel proximate said ventilation openings and abut one another proximate said hub region, wherein said first substantially axially extending necks of said first and second wheel disks contact each other along axially extending contact surfaces and said second substantially axially extending necks of said first and second wheel disks contact each other along axially extending contact surfaces; and
   a rim connected to said wheel disk for forming said strip wheel.

2. The substantially light-metal strip wheel of claim 1, wherein said ventilation opening is defined in each said wheel-disk part radially-outwardly from said hub region.

3. The substantially light-metal strip wheel of claim 2, wherein said wheel-disk parts comprise a wheel-disk inner part and a wheel-disk outer part.

4. The substantially light-metal strip wheel of claim 3, wherein an end of said neck of the wheel-disk outer part is clinched around the wheel-disk inner part.

5. The substantially light-metal strip wheel of claim 3, further comprising a stamping extending outwardly from at least one of said wheel-disk parts at said attachment hole.

6. The substantially light-metal strip wheel of claim 3, wherein said wheel-disk parts and said rim comprise partially solder-plated starting materials.

7. The substantially light-metal strip wheel of claim 6, wherein each of the rim and the wheel-disk inner part comprise an AlMgSi strip plated on one side, and the wheel-disk outer part comprises an unplated AlMgSi strip.

8. The substantially light-metal strip wheel of claim 6, wherein the wheel-disk outer part comprises an AlMgSi strip plated on both sides and each of the rim and the wheel-disk inner part comprises an unplated AlMgSi strip.

9. The substantially light-metal strip wheel of claim 7, wherein the plating comprises X AlSi 10 material.

10. The substantially light-metal strip wheel of claim 8, wherein the plating comprises X AlSi 10 material.

11. The substantially light-metal strip wheel of claim 3, wherein an outer diameter of the neck of the wheel-disk outer part is at least no greater than an inner diameter of the neck of the wheel-disk inner part.

12. A substantially light-metal strip wheel, comprising:
a wheel disk including one axially-defined guide hole, a hub region defined about said guide hole, and a plurality of attachment holes defined in and through said wheel disk in said hub region, said wheel disk comprising a wheel-disk inner part and a wheel-disk outer part each having a first substantially axially extending neck boundingly defining a ventilation opening radially-outwardly from said hub region in each said inner and outer wheel-disk parts and a second substantially axially extending neck positioned at an outermost circumference of each said inner and outer wheel disk parts, said inner and outer wheel disk parts being configured to be pressed together so that when said inner and outer wheel-disk parts are pressed together in neck-to-neck contact to form said wheel disk, said inner and outer wheel-disk parts are predeterminately spaced apart in a direction substantially perpendicular to a plane of said wheel proximate said ventilation openings and abut one another proximate said hub region, wherein said first substantially axially extending necks of said inner and outer wheel disks contact each other along axially extending contact surfaces and said second substantially axially extending necks of said inner and outer wheel disks contact each other along axially extending contact surfaces; and
a unitary rim connected to said wheel disk by one of an adhesive material, a soldering material and a welding material.

13. A substantially light-metal strip wheel, comprising:
a wheel disk including an axially-defined guide hole, a hub region defined about said guide hole, and an attachment hole defined in and through said wheel disk in said hub region, said wheel disk comprising a first wheel-disk part and a second wheel-disk part each having a first substantially axially extending neck having a first inner surface boundingly defining a ventilation opening in said each wheel-disk part and a first outer surface facing away from said ventilation opening and a second substantially axially extending neck positioned at an outermost circumference of each said first and second wheel disk parts having a second inner surface facing radially inward and a second outer surface facing radially outward, said first and second wheel disk parts being configured to be pressed together so that when said first and second wheel-disk parts are pressed together in neck-to-neck contact to form said wheel disk, said first and second wheel-disk parts are predeterminately spaced apart in a direction substantially perpendicular to a plane of said wheel proximate said ventilation openings and abut one another proximate said hub region, said first inner surface of said first wheel disk contacting said first outer surface of said second wheel disk and said second outer surface of said first wheel disk contacting the second inner surface of said second wheel disk; and
a rim connected to said wheel disk for forming said strip wheel.

* * * * *